US008995061B2

(12) United States Patent
Curtis

(10) Patent No.: US 8,995,061 B2
(45) Date of Patent: Mar. 31, 2015

(54) SPECKLE REDUCTION USING LENSLET INTEGRATOR

(75) Inventor: Kevin Curtis, Boulder, CO (US)

(73) Assignee: RealD Inc., Beverly Hills, CA (US)

( * ) Notice: Subject to any disclaimer, the term of this patent is extended or adjusted under 35 U.S.C. 154(b) by 119 days.

(21) Appl. No.: 13/544,964

(22) Filed: Jul. 9, 2012

(65) Prior Publication Data

US 2013/0010365 A1 Jan. 10, 2013

Related U.S. Application Data

(60) Provisional application No. 61/505,214, filed on Jul. 7, 2011.

(51) Int. Cl.
*G02B 27/10* (2006.01)
*G02B 27/48* (2006.01)

(52) U.S. Cl.
CPC .................................... *G02B 27/48* (2013.01)
USPC ........................................................ 359/619

(58) Field of Classification Search
USPC ................................................ 359/619, 626
See application file for complete search history.

(56) References Cited

U.S. PATENT DOCUMENTS

| | | | | |
|---|---|---|---|---|
| 4,035,068 | A | 7/1977 | Rawson | |
| 4,155,630 | A | 5/1979 | Ih | |
| 4,360,372 | A | 11/1982 | Maciejko | |
| 5,272,473 | A | 12/1993 | Thompson | |
| 5,313,479 | A | 5/1994 | Florence | |
| 6,122,023 | A | 9/2000 | Chen | |
| 6,577,429 | B1 * | 6/2003 | Kurtz et al. | 359/279 |
| 6,594,090 | B2 | 7/2003 | Kruschwitz et al. | |
| 6,844,970 | B2 | 1/2005 | Olczak | |
| 6,895,149 | B1 | 5/2005 | Jacob et al. | |
| 7,199,933 | B2 | 4/2007 | Yavid | |
| 7,244,028 | B2 | 7/2007 | Govorkov | |
| 7,342,719 | B1 | 3/2008 | Kalmanash | |
| 7,379,651 | B2 | 5/2008 | Abu-Ageel | |
| 7,489,714 | B2 | 2/2009 | Park et al. | |
| 7,527,384 | B2 | 5/2009 | Kim et al. | |
| 7,585,078 | B2 | 9/2009 | Kim | |
| 7,719,738 | B2 | 5/2010 | Abu-Ageel | |
| 7,922,333 | B2 | 4/2011 | Akahane | |

(Continued)

OTHER PUBLICATIONS

Gollier, Jacque, "Speckle Measurement Procedure," Conference Projector Summit 2010, Las Vegas NV, May 7, 2010.

(Continued)

*Primary Examiner* — James Jones
(74) *Attorney, Agent, or Firm* — Darlene K. Kondo; Neil G. Mothew

(57) ABSTRACT

Disclosed herein are techniques for the reduction speckle of a projection display system using novel lenslet integrators and related methods. In one embodiment, a lenslet integrator system for reducing speckle on a display screen may comprise a first lenslet array configured to receive incoming light for use in displaying an image on a display screen. Specifically, the first lenslet array has motion sufficient to reduce speckle by averaging multiple speckle patterns across its array. Such an exemplary system may also include a second lenslet array configured to receive light that is roughly focused from the moving first lenslet array, due to the motion of the first array. In addition, such systems may also include an output lens configured to receive light focused from the second lenslet array for output from the system for illumination of the display screen.

20 Claims, 2 Drawing Sheets

(56) References Cited

U.S. PATENT DOCUMENTS

| | | | |
|---|---|---|---|
| 2005/0008290 | A1 | 1/2005 | Miron |
| 2009/0168025 | A1 | 7/2009 | Domm |
| 2010/0053476 | A1 | 3/2010 | Maxson |
| 2010/0079848 | A1 | 4/2010 | Grasser et al. |
| 2010/0118397 | A1 | 5/2010 | Powell |
| 2010/0231491 | A1* | 9/2010 | Mizuuchi et al. ............... 345/87 |
| 2010/0296064 | A1 | 11/2010 | Silverstein et al. |
| 2010/0296065 | A1 | 11/2010 | Silverstein et al. |
| 2011/0102748 | A1 | 5/2011 | Shevlin |

OTHER PUBLICATIONS

Goodman, Joseph, “Speckle Phonomena in Optics,” Ch. 7 (Roberts and Company 2006).

Stupp, Edward et al., “Projection Displays,” pp. 116-121 (Wiley 1999).

* cited by examiner

SPECKLE REDUCTION USING LENSLET INTEGRATOR

PRIORITY CLAIM

This disclosure is a non-provisional conversion of, and thus claims priority to, U.S. Provisional Patent Application No. 61/505,214, filed Jul. 7, 2011, and entitled "Speckle reduction using lenslet integrator," which is hereby incorporated by reference in its entirety.

TECHNICAL FIELD

This disclosure generally relates to the field of lasers, and more particularly relates to integrating laser light output using a lenslet integrator.

BACKGROUND

The use of coherent or partially coherent sources can have advantages in display or illumination over standard incoherent sources (lamps) in that they can achieve higher brightness, better reliability, and larger color gamut. However, with this partial coherence comes the issue of speckle. Speckle is due to interference of the light on the screen or target that causes variations in intensity that can be seen by the observer or an instrument. These typically high frequency intensity variations are very undesirable for display or imaging applications.

BRIEF SUMMARY

This disclosure provides for the reduction speckle of a projection display system using novel lenslet integrators and related methods. In one embodiment, a lenslet integrator system for reducing speckle on a display screen may comprise a first lenslet array configured to receive incoming light for use in displaying an image on a display screen. Specifically, the first lenslet array has motion sufficient to reduce speckle by averaging multiple speckle patterns across its array. Such an exemplary system may also include a second lenslet array configured to receive light that is roughly focused from the moving first lenslet array, due to the motion of the first array. In addition, such systems may also include an output lens configured to receive light focused from the second lenslet array for output from the system for illumination of the display screen.

In some exemplary embodiments, the motion of the first lenslet array is in the plane of the array substantially perpendicular to the incoming light, is along the optical axis, or a combination thereof. In addition, in some embodiments, the motion of the first lenslet array is linear, rotational, a combination thereof, or even random. In specific embodiments, the motion of the first lenslet array comprises vibration, and may be imparted on the first lenslet array using a mechanical, electrical, or piezoelectric transducer. In advantageous embodiments, the motion of the first lenslet array may be substantially equal to a resonance frequency of a structure holding the first lenslet array. Also in advantageous embodiments, the motion of the first lenslet array is at a velocity larger than one-half of an optical wavelength of light divided by the integration time of the eye of the viewer. For example, this velocity may be greater than about 200 nm/50 ms.

In other aspects, methods for reducing speckle on a display screen are disclosed. In one embodiment, such a method may comprise illuminating a first lenslet array with incoming light for use in displaying an image on a display screen, and imparting motion on the first lenslet array sufficient to reduce speckle by averaging multiple speckle patterns. In addition, such methods may include focusing light from the moving first lenslet array onto a non-moving second lenslet array, and then focusing light from the second lenslet array to an output of the system for illumination of the display screen. Other exemplary embodiments and variations therein within the scope of the present disclosure are also presented below.

BRIEF DESCRIPTION OF THE DRAWINGS

Embodiments are illustrated by way of example in the accompanying figures, in which like reference numbers indicate similar parts, and in which.

DETAILED DESCRIPTION

Figure 1:
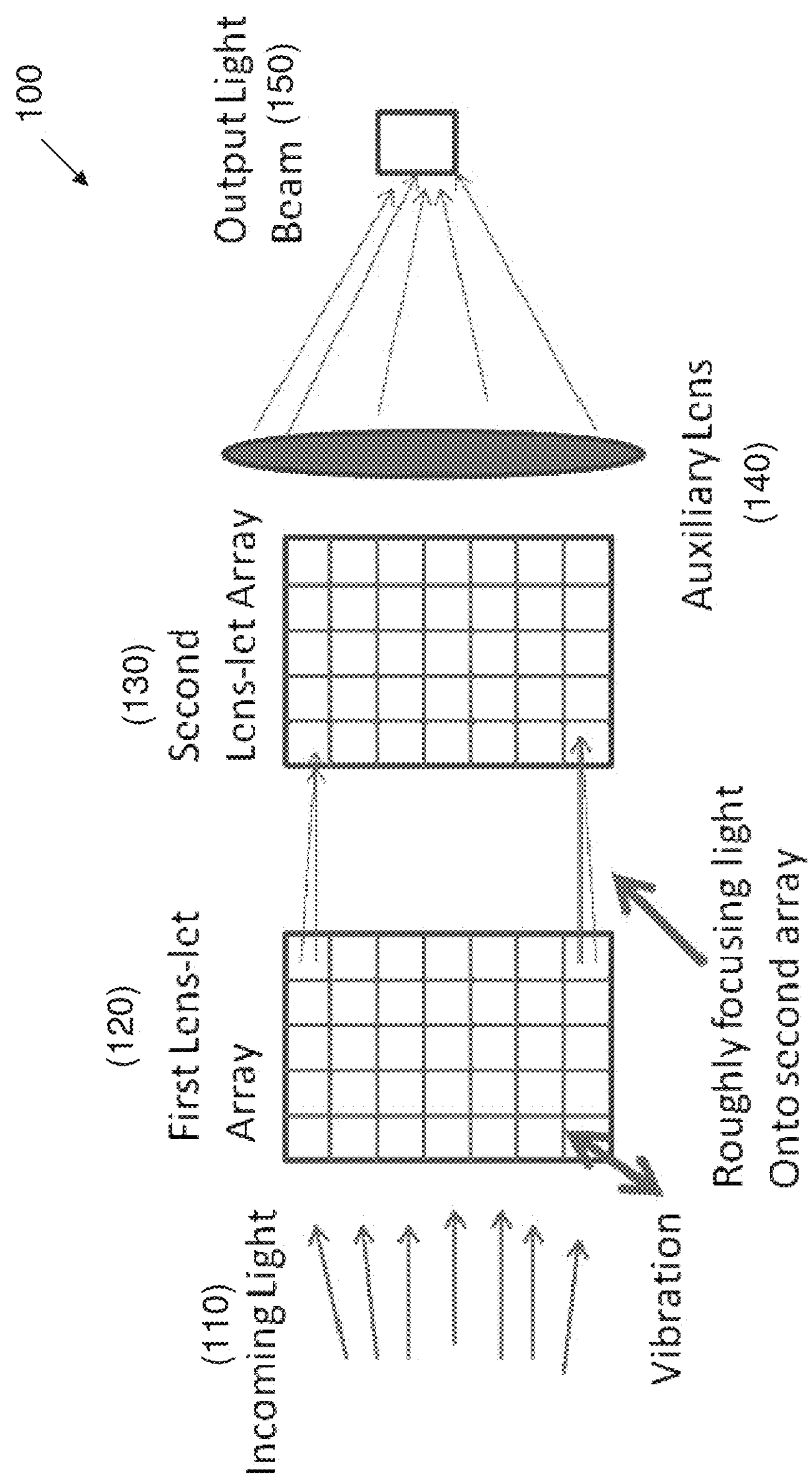
FIG. 1 is a schematic diagram showing an exemplary lenslet integrator system with motion of a first lenslet array to reduce speckle, in accordance with the present disclosure.

There are various known techniques for addressing high frequency intensity variations. How to measure and characterize speckle is also well known. Speckle is measured by measuring the contrast of the light intensity. This is defined as the standard deviation over the mean of the intensity. For how to measure speckle, See Jacques Gollier, *Speckle Measurement Procedure*, Conference Projector Summit 2010, Las Vegas Nev., May 7, 2010, herein incorporated by reference.

Some currently known techniques to reduce speckle include a first family of techniques to reduce speckle that involves using moving diffusers (one or many) to achieve changes to the phase locally to temporally average out some of the speckle over the observer's/detector's integration period. See, e.g., U.S. Pat. No. 5,313,479, entitled "Speckle-free display system using coherent light," U.S. Pat. No. 4,035,068, "Speckle minimization in projection displays by reduced spatial coherence of the image light", and U.S. Pat. No. 7,585,078, "Illumination system capable of eliminating laser speckle and projection system employing the same," all of which are herein incorporated by reference. The diffusers can also be vibrating with an amplitude that is large enough to cover several diffractive elements to achieve some averaging as well. See U.S. Pat. No. 7,922,333, entitled "Projector, screen, projector system, and scintillation removing apparatus for removing scintillation on an image," herein incorporated by reference.

A second family of techniques to reduce speckle involves using moving mirrors or phase modulators to achieve the temporal averaging. See, e.g., U.S. Published Patent Application No. 2011/0102748, entitled "Optical system and method," and U.S. Published Patent Application No. 2010/0053476, entitled "Systems and methods for despeckling a laser light source," U.S. Pat. No. 4,155,630, entitled "Speckle elimination by random spatial phase modulation," and U.S. Pat. No. 7,489,714, entitled "Speckle reduction laser and laser display apparatus having the same," all herein incorporated by reference in their entireties. Generally, a disadvantage of this family of techniques includes the use of expensive moving parts or phase modulators.

A third family of techniques to reduce speckle involves using a large core, long, very high numerical aperture (NA) multimode fiber to "decoher" a laser beam. See, e.g., U.S. Published Patent Application No. 2009/0168025, entitled "Decohered laser light production system," (herein incorporated by reference), which discusses the use of a 12 mm diameter core fiber with an NA of 0.65. This large fiber may provide some reduction in speckle but deleteriously destroys the brightness of the system since the etendue is so very large. Similarly, using a very long multimode fiber can have some benefits. For instance, see U.S. Published Patent Application No. 2010/0079848, "Speckle reduction in display systems that employ coherent light sources" but reduces the power with absorption. However, multimode fiber speckle issues and solutions seems to be well known in the field. See, e.g., Joseph Goodman, *Speckle Phenomena in Optics*, Ch. 7 (Roberts and Company 2006). All references cited in this paragraph are herein incorporated by reference.

A fourth family of techniques has been proposed that involve dividing the beam up into parts, and then forcing each part to have different path lengths or changes of polarization before recombining the beams. Examples using fiber bundles or splitter/combiners or lenslet arrays include: U.S. Published Patent Application No. 2005/0008290 "Static method for laser speckle reduction and apparatus for reducing speckle;" U.S. Pat. No. 4,360,372, "Fiber optic element for reducing speckle noise;" U.S. Pat. No. 6,895,149, entitled "Apparatus for beam homogenization and speckle reduction;" U.S. Pat. No. 7,379,651, entitled "Method and apparatus for reducing laser speckle;" U.S. Pat. No. 7,527,384, entitled "Illumination system to eliminate laser speckle and projection system employing the same;" U.S. Pat. No. 7,719,738, entitled "Method and apparatus for reducing laser speckle." U.S. Pat. No. 6,594,090, entitled "Laser projection display system," which uses a lenslet integrator in conjunction with a moving diffuser to reduce speckle, states that the integrator makes the diffuser more effective. Some published applications disclose the use of a moving lenslet array instead of a diffuser to reduce speckle. See, e.g., U.S. Published Patent Application No. 2010/0296065, entitled "Out-of-plane motion of speckle reduction element," and U.S. Published Patent Application No. 2010/0296064, entitled "Projection with lenslet arrangement on speck reduction element." These teachings use expensive fiber bundles or lens arrays or many fiber coupler/splitters to achieve some reduction in speckle. All references cited in this paragraph are herein incorporated by reference.

Another family of solutions exist utilizing sources with larger spectral bandwidths. This can be achieved by chirping the drive current, using several lasers of different wavelengths or other means.

Moving the screen is also a potential solution to the undesirable problem of speckle. In chapter six of the book "Speckle Phenomena in Optics", supra, the linear shift rate of the screen in x or y or screen rotation (these motions are the plane of the screen which is roughly normal to the projection) is calculated in order to average out some of the speckle during the observer's/detector's time integration period. By moving it, the light hits different parts of the screen which then changes the speckle pattern. If this is done fast relative to the detector's integration period (for example, the eye is roughly 20 Hz) then the detector will see an average of several speckle patterns, which results in a lower speckle contrast. In U.S. Pat. No. 5,272,473, entitled "Reduced-speckle display system," the use of a transducer attached directly to the screen to mechanically generate surface acoustic waves to minimize speckle is taught. U.S. Pat. No. 6,122,023, entitled "Non-speckle liquid crystal projection display" teaches the use of a highly scattering liquid crystal as a screen, and then electrically changing the liquid crystal states to alleviate speckle. Other teachings have used scattering liquids or diffuser cells as screens to improve speckle. See, e.g., U.S. Pat. No. 6,844,970, entitled "Projection television set, screens, and method;" U.S. Pat. No. 7,199,933, "Image projection screen with reduced speckle noise;" U.S. Pat. No. 7,244,028, "Laser illuminated projection displays", U.S. Pat. No. 7,342,719, "Projection screen with reduced speckle," and U.S. Published Patent Application No. 2010/0118397, "Reduced laser speckle projection screen." All references cited in this paragraph are herein incorporated by reference.

In practice, it is common to use a few of the techniques together in order to reduce speckle to a significant level. All of these involve using many other additional parts and/or motion to achieve some reduction on speckle. These additional parts increase cost, decrease brightness, and reduce reliability.

In projection systems, integrators may be used to make the display illumination beams more uniform. Examples of integrators are light guides (slabs of glass) that the light propagates down with many bounces using total internal reflections. An example is a glass slab, for example, having dimensions 8 mm×16 mm×160 mm, that is illuminated with a divergent or convergent beam to get many ray reflections. The transverse sides are normally the same ratio as the spatial light modulators used in the projection system. Another example would be a hollow light guide with sides that are made of mirrors to achieve the same effect. These can be square, rectangular or circular aspect ratio. Another type of integrator used is a very larger fiber or fiber bundle. Another common integrator is the lenslet integrator. This uses a first lenslet array to take the incoming light and focus it onto a second lenslet array. After this array, an auxiliary lens focuses the beam to an image plane that is very uniform compared to the incoming illumination. If the lenslet array aspect ratio is square or rectangular, the image plane will be square or rectangular. See Edward Stupp and Mathew Brennesholtz, *Projection Displays*, pp. 116-121 (Wiley 1999), hereby incorporated by reference.

In a first aspect, disclosed herein are techniques employing integrators in a manner to reduce speckle in an illuminated display system, that overcome deficiencies associated with the conventional techniques discussed above for addressing speckle. FIG. 1 is a schematic diagram showing an exemplary lenslet integrator system 100 constructed in accordance with the principles disclosed herein. Specifically, the exemplary lenslet integrator system 100 provides for motion of a first lenslet array 120 to reduce speckle. As shown by the exemplary lenslet integrator system 100 of FIG. 1, motion of the first lenslet array 120 of a lenslet integrator may be used to reduce speckle by averaging multiple speckle patterns.

The incoming light 110 is typically not spatially uniform, as is desired for illumination of the modulators in a display device. The input incoming light 110 is likely very spatially non-uniform (for example, Gaussian-like light intensity distribution). Thus, the incoming light 110 is divided up (i.e., sampled) by the first lenslet array 120. This sampled light is roughly focused on the second lenslet array 130, which generates multiple beams that overlap, with the total being fairly spatially uniform. The auxiliary lens 140 captures these beams and creates the final output beam 150 that is the spatially uniform beam. By vibrating the first lenslet 120, the phase profile of the output beam 150 will be changed, and the resulting beam on the screen can be time averaged by the view to reduce speckle. In advantageous embodiments, the lenslets 120 and 130 and lens 140 may be anti-reflection coated to improve optical throughput.

Since integration making the intensity of incoming light 110 more uniform is desired in projection systems, the disclosed principles provide both spatial uniformity and speckle reduction in the same optical system by adding motion of the first lenslet array 120 of the integrator. The motion can be linear, rotational, and/or random, as well as vibrating the lenslet array 120, as illustrated. The motion can be in the plane of the lenslet array 120 (roughly perpendicular to incoming light 110 propagation), or the motion can be along the optical axis or some combination thereof. An exemplary system for de-speckle and homogenizing a beam is shown in FIG. 1.

If using vibration as the motion for the first lenslet array 120, the motion may be created using a mechanical, electrical, piezoelectric or other type of transducer. The structure that holds the first lenslet array 120 may be designed with a specific resonance and the transducer may drive the mechanical structure at this resonance to achieve larger amplitude vibration with less energy. In specific embodiments, the first lenslet 120 may have a holder that has a designed resonance that is higher than 20 Hz. The vibration source(s) may be matched to the resonance of that structure to make shaking/moving the lenslet more efficient. Mechanical vibration devices or transducers can be used as well as electrical, acoustic, or piezoelectric transducers. Examples of mechanical transducers include the typical rotating a mechanically off center mass which results in vibration. Advantageously, the vibration may be faster than the human eye to reduce speckle with temporal averaging. For example, the velocity may be larger than one-half of an optical wavelength of light divided by the integration time of the eye of the viewer. Thus, a frequency of >20 Hz should be used.

The amplitude of the vibration may be some fraction of the lenslet or the lenslets 120 focal length to achieve motion of the illumination light on the modulator. With projection displays, even 0.1-5% of the pixel dimension or focal length can be sufficient amplitude.

The incoming light 110 can be from a lamp, light emitting diode, or laser or some combination of these sources. It can be collimated or converging or diverging. An exemplary system in accordance with the disclosed principles may also contain diffusers or other conditioning optics, such as magnification relays as needed.

The above-discussed technique for reducing speckle may also be combined with the other techniques, such as one or more of those techniques discussed above. For motion other than vibration, the motion should result in similar amount of motion as mentioned above in a time that is shorter the 1/20th second.

Figure 2:
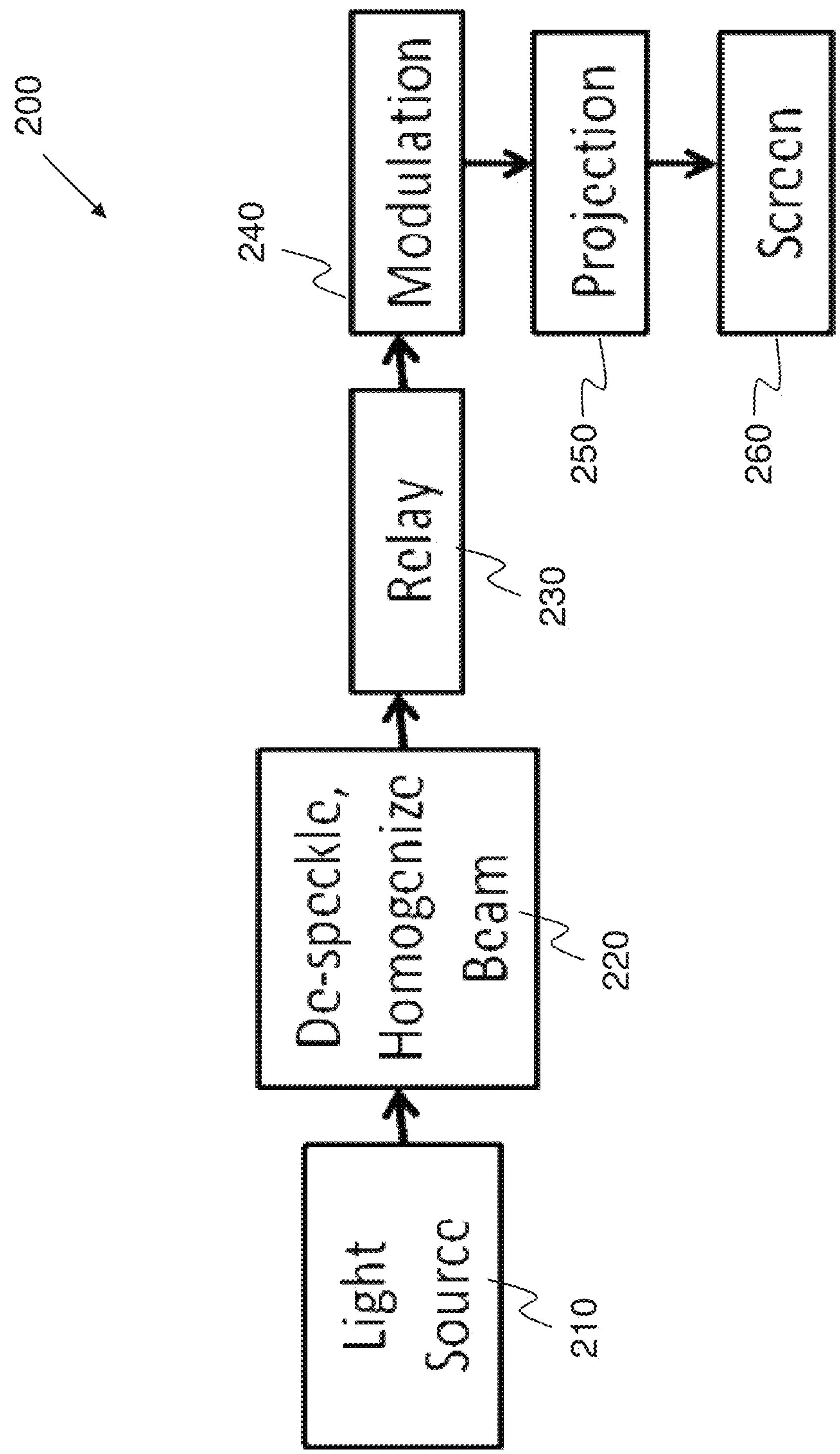
FIG. 2 is a schematic diagram of a digital projection system, in accordance with the present disclosure.

FIG. 2 is a schematic block diagram of a digital projection system 200, also constructed in accordance with the disclosed principles. In this aspect of the disclosed technique, despeckle and beam homogenization is used with a digital projection system 200, as shown in FIG. 2.

The light source 210 may be lamp, LED, and/or lasers sources. The light source 210 may also use reflectors or lens(es) to more efficiently collect light. Color filters, such as color wheels, may also be in the light source 210. Section 220, which contains the lenslet despeckler in accordance with the presently disclosed principles, can be used to homogenize and despeckle all the light from the light source(s) 210. Also, multiple lenslet despecklers can be used to homogenize and despeckle light from different parts of the overall light source(s) 210. For example, light source 210 may contain three lasers (red, green, and blue) and a despeckling lenslet homogenizer can be used on their combined output, or a lenslet homogenizer can be used on each laser's output and then their outputs combined separately after being homogenized and despeckled.

The relay 230 can relay the output beam 220 onto the modulation device(s) 240. The relay portion of the system 200 may also be used to achieve the correct aspect ratio and magnification. The aspect ratio may also be correctly set in the de-speckle/homogenize beam portion 220 of the system 200. The modulation 240 may be done with micro-mechanical or liquid crystal based spatial light modulators. With multiple or single modulators 240 used, color separation optics, such as filters or prisms, may be used to manipulate the light. Examples of modulators 240 include deformable mirror devices (DMDs) and grating light value devices. The projection portion 250 of the system may include the projection lens, beam block, polarization conversion and polarization switching. Polarization switching may be used for the most common form of 3-dimensional (3D) movie projection. Color switching could also be included in the projection stage 250 of the system 200 for 3D projection needs. The light for the projector 250 is then directed onto a display screen 260 for viewing by the audience. In some cases, the display screen 260 may be a polarization preserving screen that allows polarization to be used to view 3D content. Polarization preserving screens generate more speckle than traditional lambertian-like screens. The projection 250 and screen 260 components could be front or rear projection. If 3D content is displayed, the viewer may also wear glasses to see the 3D content.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera. Such relativity between items ranges between less than one percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed is:

1. A lenslet integrator system for reducing speckle on a display screen, the system comprising:

a first lenslet array configured to receive incoming light for use in displaying an image on a display screen, the first lenslet array having motion sufficient to reduce speckle by averaging multiple speckle patterns;

a second lenslet array configured to receive light focused from the moving first lenslet array; and an output lens configured to receive light focused from the second lenslet array for output from the system for illumination of the display screen.

2. A lenslet integrator system according to claim 1, wherein the motion of the first lenslet array is in the plane of the array substantially perpendicular to the incoming light, is along the optical axis, or a combination thereof.

3. A lenslet integrator system according to claim 1, wherein the motion of the first lenslet array is linear, rotational, a combination thereof, or random.

4. A lenslet integrator system according to claim 1, wherein the motion of the first lenslet array comprises vibration.

5. A lenslet integrator system according to claim 4, wherein the vibration is imparted on the first lenslet array using a mechanical, electrical, or piezoelectric transducer.

6. A lenslet integrator system according to claim 1, wherein the motion of the first lenslet array is substantially equal to a resonance frequency of a structure holding the first lenslet array.

7. A lenslet integrator system according to claim 1, wherein the motion of the first lenslet array is at a velocity larger than one-half of an optical wavelength of light divided by the integration time of the eye of the viewer.

8. A lenslet integrator system according to claim 7, wherein the velocity of the motion is greater than about 20 Hz.

9. A method for reducing speckle on a display screen, the method comprising:

illuminating a first lenslet array with incoming light for use in displaying an image on a display screen;

imparting motion on the first lenslet array sufficient to reduce speckle by averaging multiple speckle patterns;

focusing light from the moving first lenslet array onto a non-moving second lenslet array; and focusing light from the second lenslet array to an output of the system for illumination of the display screen.

10. A method according to claim 9, wherein imparting motion on the first lenslet array further comprises imparting motion in the plane of the array substantially perpendicular to the incoming light, along the optical axis, or a combination thereof.

11. A method according to claim 9, wherein imparting motion on the first lenslet array further comprises imparting linear motion, rotational motion, a combination thereof, or random motion.

12. A method according to claim 9, wherein imparting motion on the first lenslet array further comprises imparting vibration.

13. A method according to claim 12, wherein imparting vibration further comprises imparting vibration on the first lenslet array using a mechanical, electrical, or piezoelectric transducer.

14. A method according to claim 9, wherein imparting motion on the first lenslet array further comprises imparting motion that is substantially equal to a resonance frequency of a structure holding the first lenslet array.

15. A method according to claim 9, wherein imparting motion on the first lenslet array further comprises imparting motion at a velocity larger than one-half of an optical wavelength of light divided by the integration time of the eye of the viewer.

16. A method according to claim 15, wherein the velocity of the motion is greater than about 20 Hz.

17. A lenslet integrator system for reducing speckle on a display screen, the system comprising:

a light source configured to provide incoming light to the integrator system for use in displaying an image on a display screen;

a first lenslet array configured to receive the incoming light, the first lenslet array having vibration sufficient to reduce speckle by averaging multiple speckle patterns;

a non-moving second lenslet array configured to receive light focused from the vibrating first lenslet array; and an output lens configured to receive light focused from the non-moving second lenslet array for output from the system for illumination of the display screen.

18. A lenslet integrator system according to claim 17, further comprising a transducer associated with the first lenslet array and configured to impart the vibration on the first lenslet array using mechanical, electrical, or piezoelectric means.

19. A lenslet integrator system according to claim 17, wherein the vibration of the first lenslet array is substantially equal to a resonance frequency of a structure holding the first lenslet array.

20. A lenslet integrator system according to claim 17, wherein the vibration of the first lenslet array is at a velocity larger than one-half of an optical wavelength of light divided by the integration time of the eye of the viewer.

* * * * *